United States Patent
Reese et al.

(10) Patent No.: US 7,076,539 B2
(45) Date of Patent: Jul. 11, 2006

(54) NETWORK CONNECTIVITY ESTABLISHMENT AT USER LOG-IN

(75) Inventors: Curtis Reese, Boise, ID (US); Brett A. Green, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 848 days.

(21) Appl. No.: 09/918,418

(22) Filed: Jul. 30, 2001

(65) Prior Publication Data

US 2003/0023764 A1    Jan. 30, 2003

(51) Int. Cl.
  G06F 15/177   (2006.01)
  G06F 15/16    (2006.01)
  G06F 9/00     (2006.01)
  G06F 3/00     (2006.01)

(52) U.S. Cl. ............ 709/222; 709/221; 709/250; 713/2; 710/10; 710/11

(58) Field of Classification Search ........ 709/220, 709/221, 222, 250; 713/1, 2, 103; 710/10, 710/11
See application file for complete search history.

(56) References Cited

U.S. PATENT DOCUMENTS

| | | | | |
|---|---|---|---|---|
| 5,596,723 A | * | 1/1997 | Romohr | 709/222 |
| 5,655,077 A | * | 8/1997 | Jones et al. | 713/201 |
| 5,948,064 A | * | 9/1999 | Bertram et al. | 709/225 |
| 5,978,912 A | * | 11/1999 | Rakavy et al. | 713/2 |
| 6,021,496 A | * | 2/2000 | Dutcher et al. | 713/202 |
| 6,212,561 B1 | * | 4/2001 | Sitaraman et al. | 709/225 |
| 6,535,976 B1 | * | 3/2003 | Hoggarth et al. | 713/2 |
| 6,557,033 B1 | * | 4/2003 | Maeda | 709/223 |
| 6,711,688 B1 | * | 3/2004 | Hubacher et al. | 713/201 |
| 2003/0014476 A1 | * | 1/2003 | Peterson | 709/203 |

OTHER PUBLICATIONS

NT 4.0 Resource Kit: Resource Guide, Chapter 19, "What Happens When You Start Your Computer", Jun. 20, 1997.
NetSwitcher computer program, www.netswitcher.com and other web sites, various dates including Apr. 24, 2001, May 23, 2000, Aug. 1999, Mar. 2001.
Definition of "Driver," Computer Desktop Encyclopedia, copyright 1981-2004, ver. 17.4, 4th Quarter 2004.
Definition of "Driver," Microsoft Computer Dictionary, 4th Edition, copyright 1999.

* cited by examiner

*Primary Examiner*—Kim Huynh
*Assistant Examiner*—Alan S. Chen

(57) ABSTRACT

Establishing network connectivity at user log-in for a computer system is disclosed. A computer is disclosed that includes one or more network components, such as modems and network adapters. Each network component enables the computer to communicate with one or more different networks, such as corporate networks, the Internet, and so on. An operating system of the computer has an initial boot sequence in which network connectivity is established only after a user logged in. The user specifies the desired networks to communicate with during log-in. A method specifying a boot sequence for a computer in which network connectivity is established at user log-in, and a computer-readable medium having instructions stored thereon for execution by a processor to perform such a method, are also disclosed.

10 Claims, 7 Drawing Sheets

NETWORK CONNECTIVITY ESTABLISHMENT AT USER LOG-IN

FIELD OF THE INVENTION

This invention relates generally to computer systems in which users log into the systems, and more particularly to such systems in which different network connectivity is possible or desired.

BACKGROUND OF THE INVENTION

Traditional desktop computers are located at a single physical place for long periods of time, if not indefinitely. This means that once the computers have had their network connectivity configured, the network connectivity does not typically have to be altered for a long time, and usually not on a daily basis, for instance. Network connectivity is generally defined as the current ability of a computer to connect with one or more different networks. Network connectivity usually needs the presence of network components, such as wired or wireless modems, network adapters, and so on, and the configuration of these components so that they can communicate with one or more networks.

Network connectivity is typically established consistent with one or both of a hardware profile and a network profile. A hardware profile is generally defined as the settings that govern a specific configuration of peripherals and drivers of a computer. Multiple profiles allow a user set up more than one hardware configuration. A driver, or a device driver, is generally and non-restrictively defined as a program routine that links a peripheral device to the operating system. It is typically written by programmers who understand the detailed knowledge of the device's command language and characteristics and contains the precise machine language necessary to perform the functions requested by the application. Network device drivers are drivers for network devices, or components.

A network profile is generally defined as the networking-specific parts of a user profile, and/or the specific network configuration settings needed to achieve desired network connectivity. A user profile describes the system configuration for a specific user, including the user's environment and preference settings. For example, settings and configuration options specific to the user, such as installed application, desktop icons, color options, and so on, can be contained in a user profile. Aspects of the user profile specific to networking may be referred to as a network profile, which are the configuration settings needed to achieve desired network connectivity. These settings may include, for example, the user's network name, the type of network connection, network parameters needed to log into a specific network(s), and so on.

Most operating systems, such as versions of the MICROSOFT WINDOWS operating system, establish network connectivity while the computer is being started. Along with other boot sequence operations, such as the detection of hardware, the self-testing of the computer, and so on, network connectivity is established consistent with the configuration that has been earlier specified. When the user is requested by the system to log-in, by entering a user name and optionally a password, network connectivity has already been established. Again, for desktop computers that are typically located in a single place and consistently connected to the same network, this is a logical choice for when to establish network connectivity.

However, laptop computers have more recently become exceedingly popular. Laptop computers allow their users to transport them from work to home and back again, and also to transport them while traveling. At each different location, a user may need different network connectivity. For example, when the user is at work, he or she typically connects via a network adapter to the corporate network, but when the user is at home, he or she may instead connect via a modem to the Internet, through an Internet service provider (ISP). However, by the time the user is asked by the system to log-in, network connectivity has already been established, such that the user has no option to specify different network connectivity for that computing session. When the user is at home, for instance, and the computer's network connectivity is configured for work, the system may attempt to connect with the corporate network through the network adapter, and will be unable to do so.

The traditional solution to this problem has been for the user to boot up his computer with the incorrect network connectivity established, manually change the configuration of the network connectivity for the next time the computer is turned on, and restart the computer to establish the new network connectivity. The start-up and shutdown processes of many computer systems are very long, and can each easily exceed a number of minutes. Therefore, this traditional solution is inconvenient for the user who has to have different network connectivity at different times for his or her computer system.

Another prior art approach to mitigating this problem is a shutdown tool that some utility programs have that requests the user to specify the network connectivity that should be established the next time the computer is turned on. For example, if the user is shutting down for the day at work, and plans to next use the computer at home, he or she would specify just before the computer shuts down that home network connectivity should be established the next time the computer is turned on. However, this solution requires the user to know the type of network connectivity that needs to be established the next time he or she uses the computer, which is not always possible.

For example, the user may specify that home network connectivity be established the next time the computer is turned on, but then may have forgotten to send an email at work before leaving for the day. The user thus turns the computer back on, which tries to establish network connectivity for home, not for work. The user must again shutdown, this time specifying that work network connectivity be established the next time the computer is turned on, and again restart the system. For the user wanting to use the computer at work again for only a few minutes to send one more email, this is an inconvenient and lengthy process to follow.

For these and other reasons, therefore, there is a need for the present invention.

SUMMARY OF THE INVENTION

The invention relates to establishing network connectivity at user log-in for a computer system. A computer of one embodiment includes one or more network components, such as modems, network adapters, and so on. Each network component enables the computer to communicate with one or more different networks, such as corporate networks, the Internet, and so on. An operating system of the computer has an initial boot sequence in which network connectivity is established only after a user logged in. The user specifies the desired networks to communicate with during log-in.

A method of one embodiment of the invention specifies a boot sequence for a computer, including a pre-log-in boot sequence and a post-log-in boot sequence. The pre-log-in boot sequence does not include selection of a hardware profile, nor does it load network device drivers. The post-log-in boot sequence, conversely, includes loading the network device drivers consistent with a network profile and the hardware profile. The user at least implicitly selects these profiles during log-in.

A computer-readable medium of one embodiment of the invention has stored instructions for execution by a processor to perform a method. The method includes a pre-log-in boot sequence, a user log-in, and a post-log-in boot sequence. The pre-log-in boot sequence does not include selection of a hardware profile, and does not load network device drivers. During the user log-in, the user at least implicitly selects the network profile and the hardware profile. The post-log-in boot sequence includes loading the network drivers consistent with the network profile and the hardware profile.

At least some embodiments of the invention provide for advantages over the prior art. Because network connectivity is not established until after a user has logged in, the user is provided with an opportunity during the log-in process to specify the network(s) with which he or she wishes to communicate. For example, when the user is at work, he or she may specify a corporate network, whereas when the user is at home, he or she may specify the Internet. In this way, the user implicitly selects hardware and network profiles, for which appropriate and consistent network drivers can be loaded.

Embodiments of the invention, therefore, allow the user to indicate during log-in the network connectivity that is currently needed by the user. The user does not have to guess at shutdown time what network connectivity will be needed the next time he or she uses the computer, nor does the user have to reconfigure the network connectivity and then restart the computer to obtain the currently needed connectivity. Still other advantages, embodiments, and aspects of the invention will become apparent by reading the detailed description that follows, and by referring to the accompanying drawings.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Multiple Examples Network Connectivity Scenarios

Figure 1:
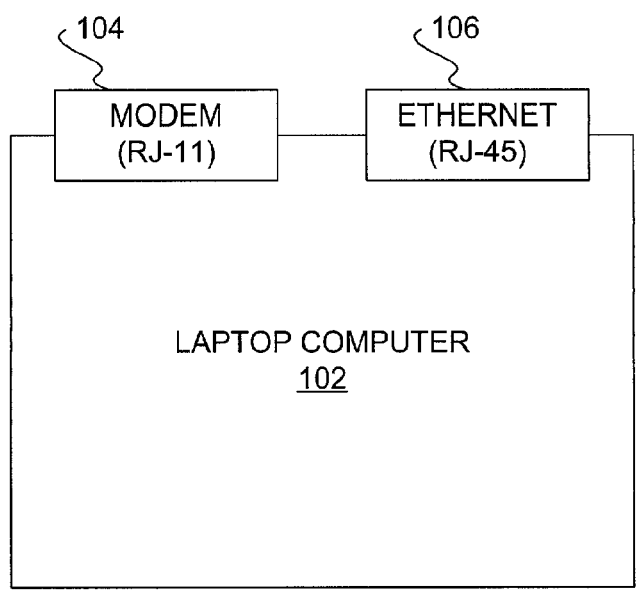
FIGS. 1, 2, 3, and 4 are diagrams showing multiple examples of network connectivity scenarios that the user can specify during log-in in conjunction with embodiments of the invention.

FIGS. 1–4 show multiple examples of network connectivity scenarios that the user can specify during log-in in conjunction with embodiments of the invention. In FIG. 1, a laptop computer 102 is shown that has an analog modem 104 with an RJ-11 connector, and an Ethernet adapter 106 with an RJ-45 connector. The modem 104 and the adapter 106 are examples of network components. The Ethernet adapter is a specific type of network adapter. The modem 104 and the adapter 106, because of their RJ-11 and RJ-45 connectors, respectively, are wired network components, or devices, because they require an appropriate cable to be plugged into their connectors to achieve network connectivity. However, wireless network components can also be used. Furthermore, computers other than laptop computers can also be employed.

Figure 2:
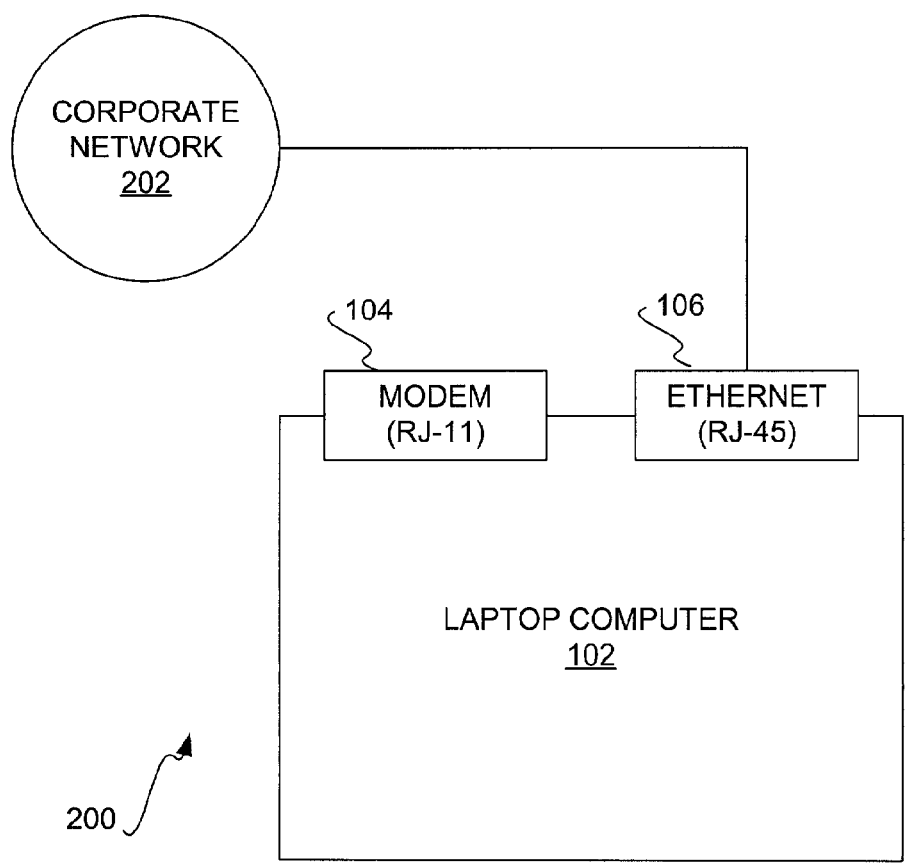
Figure 3:
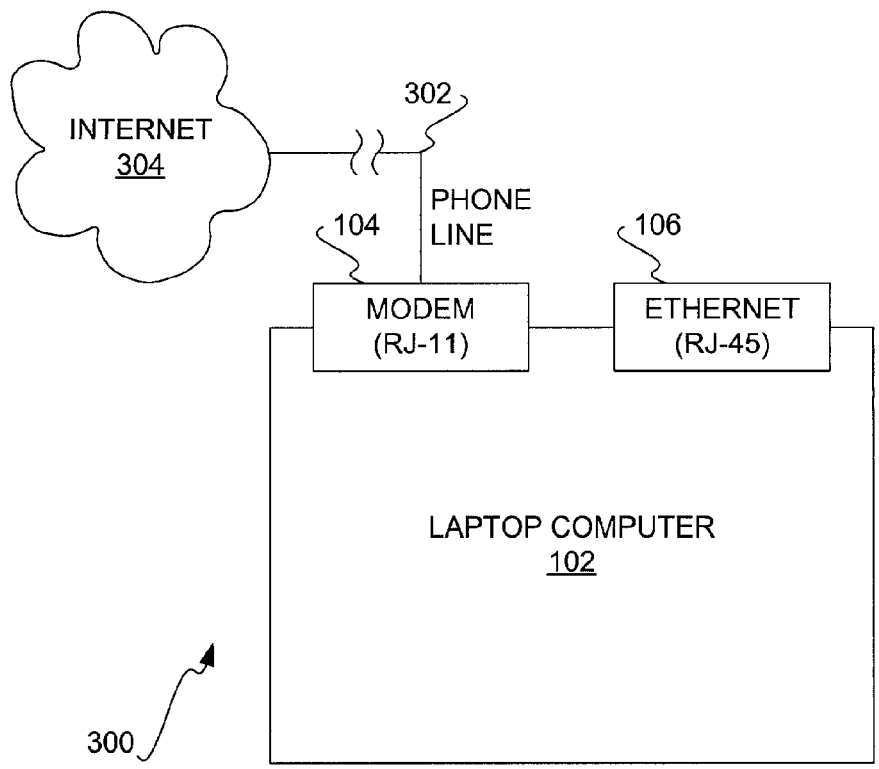

FIG. 2 shows an example of a network connectivity scenario 200 in which the user is using the laptop computer 102 to connect to a corporate network 202 at work. Specifically, the Ethernet adapter 106 is used to connect to the corporate network 202. The modem 104 is not used in the scenario 200. By comparison, FIG. 3 shows an example of a network connectivity scenario 200 in which the user is using the laptop computer 102 to connect to the Internet 304 at home. The modem 104 connects to a phone line 302 to communicate with an Internet service provider (ISP), which is not shown in FIG. 3. The Ethernet adapter 106 is not used in the scenario 300.

Figure 4:
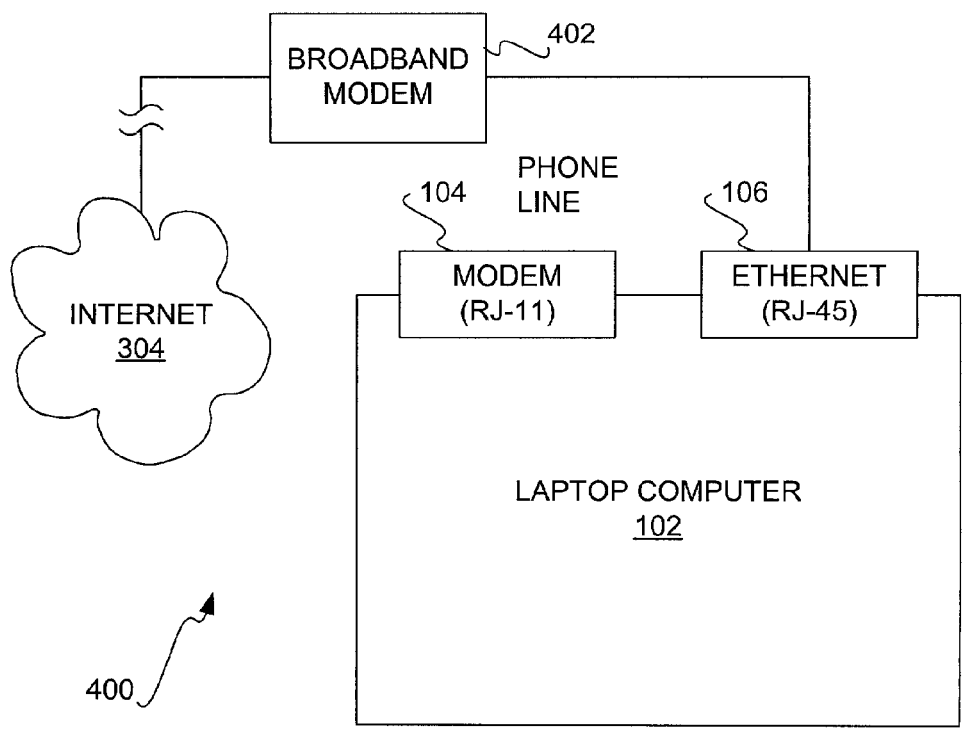

Alternatively, FIG. 4 shows an example of a scenario 300 in which the user is using the computer 102 to connect to the Internet 304 at home, through a broadband modem 402, such as a Digital Subscriber Line (DSL) modem or a cable modem. The Ethernet adapter 106 is specifically used to connect the laptop computer 102 to the broadband modem 402. The modem 104 is not used in the scenario 400.

Although FIGS. 1–4 show examples of network connectivity scenarios that can be implemented in conjunction with embodiments of the invention, other network connectivity scenarios are also possible, and FIGS. 1–4 do not represent an exhaustive list of all such scenarios. For example, other than a corporate network and the Internet, embodiments of the invention can be used in conjunction with other types of networks. Such networks include Ethernet networks, intranets, extranets, local-area networks (LAN's), wide-area networks (WAN's), virtual private networks (VPN's), and home networks. Whereas FIGS. 1–4 have been described in conjunction with a laptop computer, embodiments of the invention are also amenable to other types of computers.

User Selection of Network Connectivity at Log-In

Figure 5:
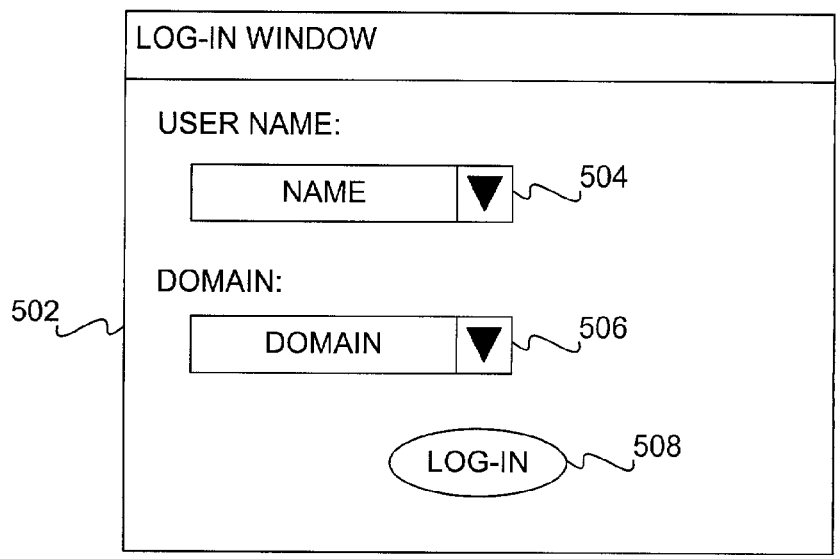
FIGS. 5, 6, and 7 are diagrams showing how specific embodiments allow a user to select a desired type of network connectivity during log-in in different ways.
Figure 6:
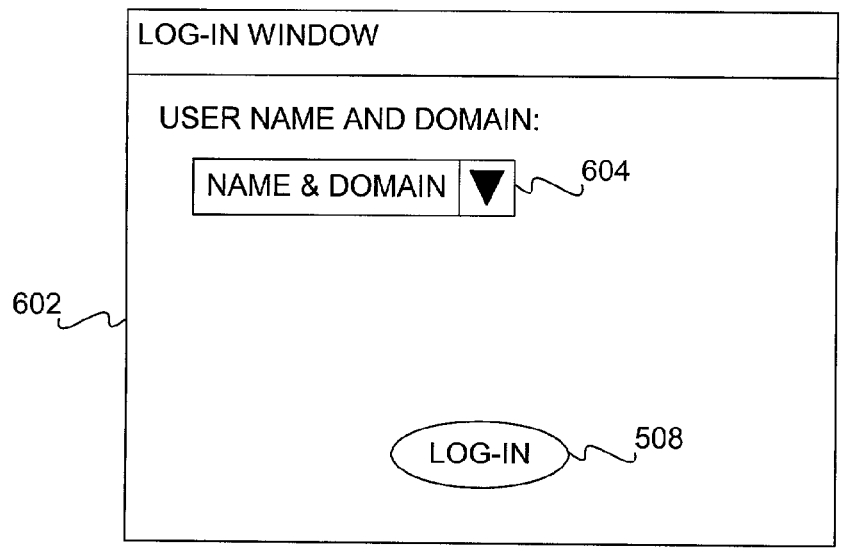
Figure 7:
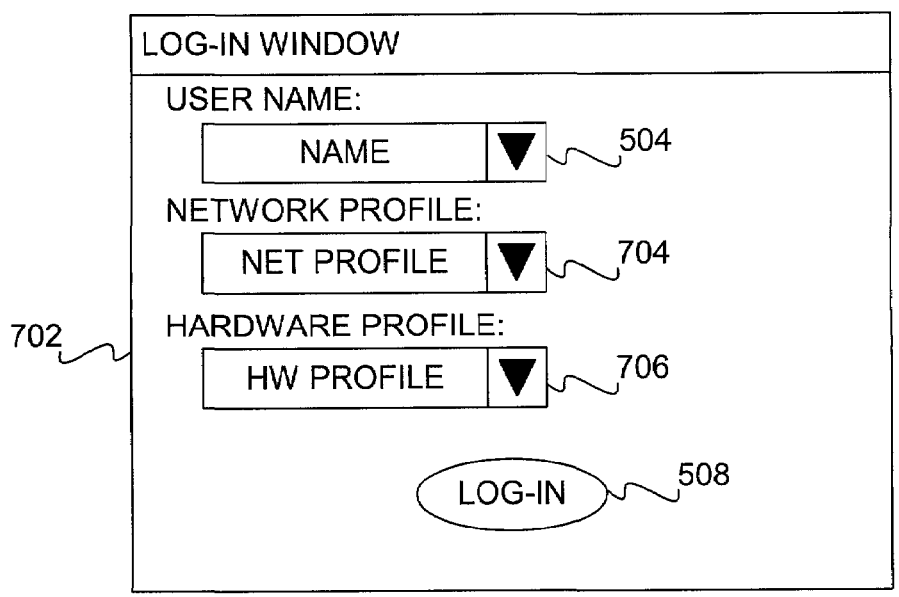

FIGS. 5–7 show how specific embodiments allow a user to select a desired type of network connectivity during log-in in different ways. More specifically, FIGS. 5–7 show log-in windows by which the user can select one or more networks with which to communicate. The log-in windows of FIGS. 5–7 can operate in conjunction with other embodiments of the invention in which the boot sequence of the computer on which they run does not select the hardware profile, nor load the network device drivers, until after user log-in. This is described in detail in the next section of the detailed description.

In FIG. 5, the log-in window 502 allows the user to select a user name and a domain during log-in. The user name is selected through the drop-down selection box 504, whereas the domain is selected through the drop-down selection box 506. The user can select from one or more different pre-configured user names, and one or more different domains. Each different user name may be associated with one or more specific domains, or the user names and the domains may be independent of one another. Once the user has made the desired selections, he or she uses a pointing device, such as a mouse, to click on the log-in button 508.

The domain indicates the type of network connectivity that the user wishes to establish, where the domain is associated with a given network profile. Thus, the user specifies which one or more networks are to be used for the current computing session by specifying a unique user name and a unique domain. The network profile and the hardware profile are implicitly selected by the user selecting the domain. For example, if the user is connecting to a corporate network, the network profile may include the user name on the corporate network, the sub-network to which the user belongs to, and other configuration information for this network. The hardware profile may specify that the modem is disabled, and the network adapter is enabled.

In FIG. 6, the log-in window 602 alternatively allows the user to select a unique combination of a user name and a domain during log-in. This unique combination is selected through the drop-down selection box 604. Once the user has made the desired selection, he or she clicks on the log-in button 508. Thus, the user specifies which one or more networks are to be used for the current computing session by specifying a unique combination of a user name and a domain. The network profile and the hardware profile are implicitly selected by the user selecting this unique combination.

In FIG. 7, the log-in window 702 allows the user to select a unique user name, a unique network profile, and a unique hardware profile during log-in. The user name is selected through the drop-down selection box 504, the network profile through the drop-down selection box 704, and the hardware profile through the drop-down selection box 706. Once the user has made the desired selections, he or she clicks on the log-in button 508. The user name, network profile, and the hardware profile may be individually independent of one another, or dependent on each other. As an example, selecting a given user name may determine which network and hardware profiles may be selected.

In comparison to the embodiments of FIGS. 5 and 6, which allow a user to implicitly select network and hardware profiles by selecting a user name, a domain, or a combination thereof, the embodiment of FIG. 7 allows the user to explicitly select the network and hardware profiles. The embodiment of FIG. 7, therefore, provides a finer level of granularity in specifying the network and hardware profiles than do the embodiments of FIGS. 5 and 6. The user thus specifies which one or more networks that are desired to be used for the current computing session by specifying the user name, the network profile, and the hardware profile.

Boot Sequences to Achieve User Selection of Network Connectivity at Log-In

Figure 8:
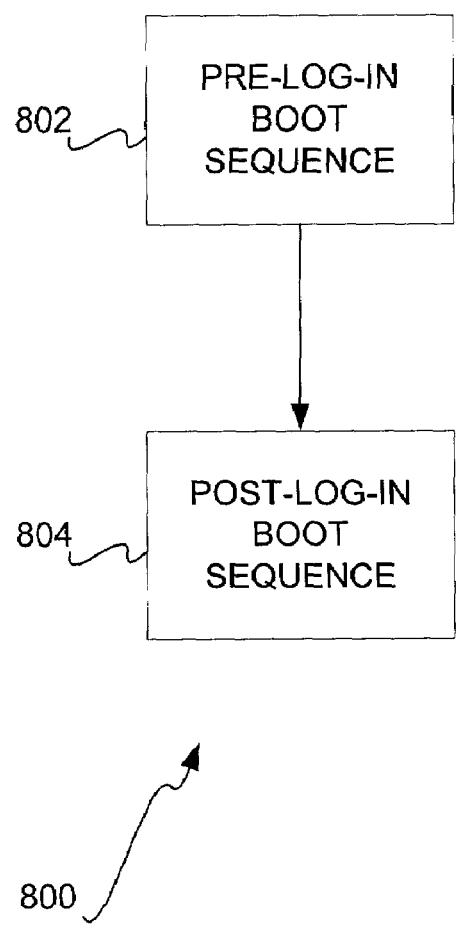
FIGS. 8, 9, and 10 show the boot sequences that can be followed by a computer, such as by the operating system of the computer, to achieve user selection of network connectivity at log-in, according to varying embodiments of the invention.
Figure 9:
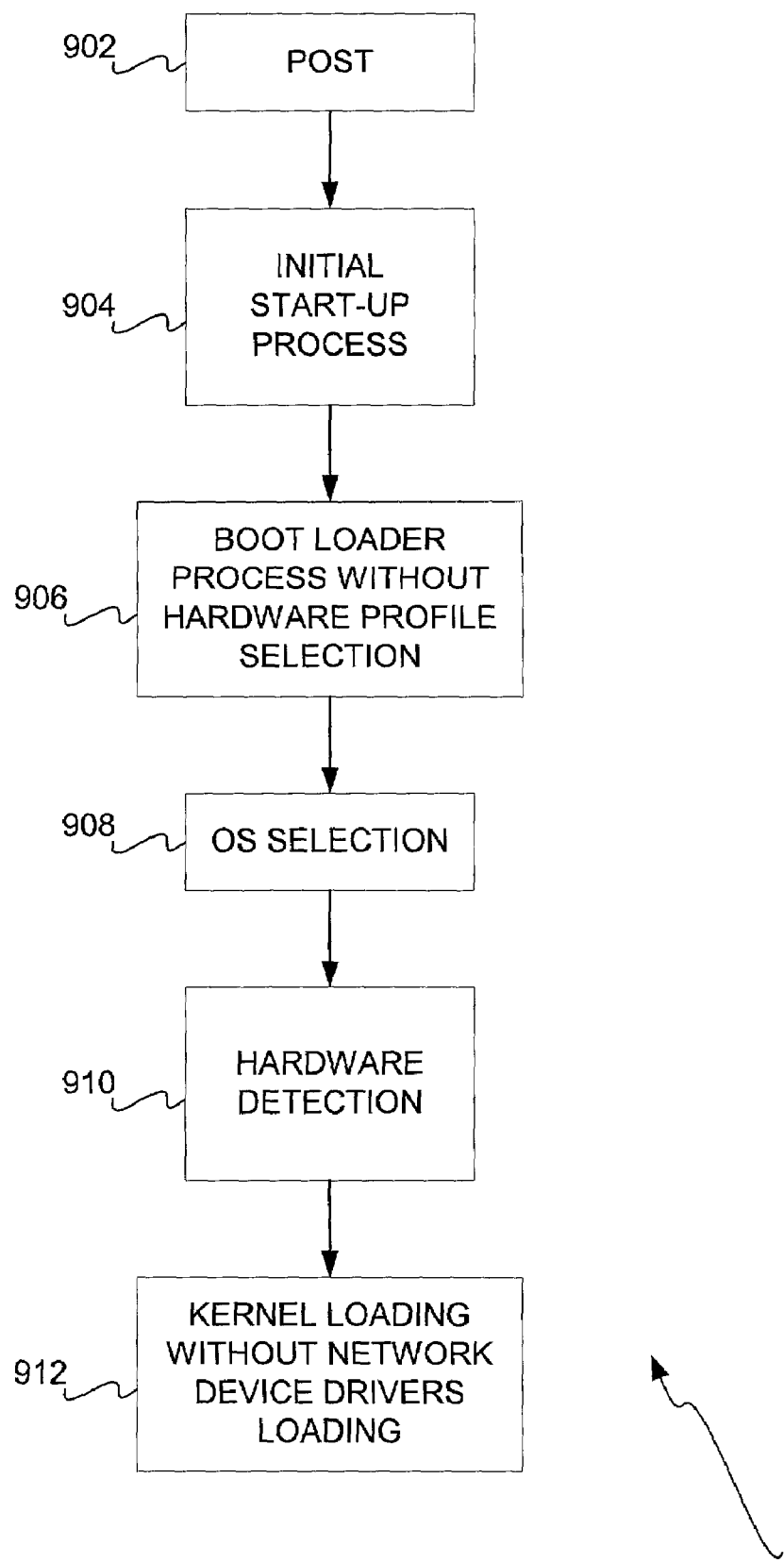
Figure 10:
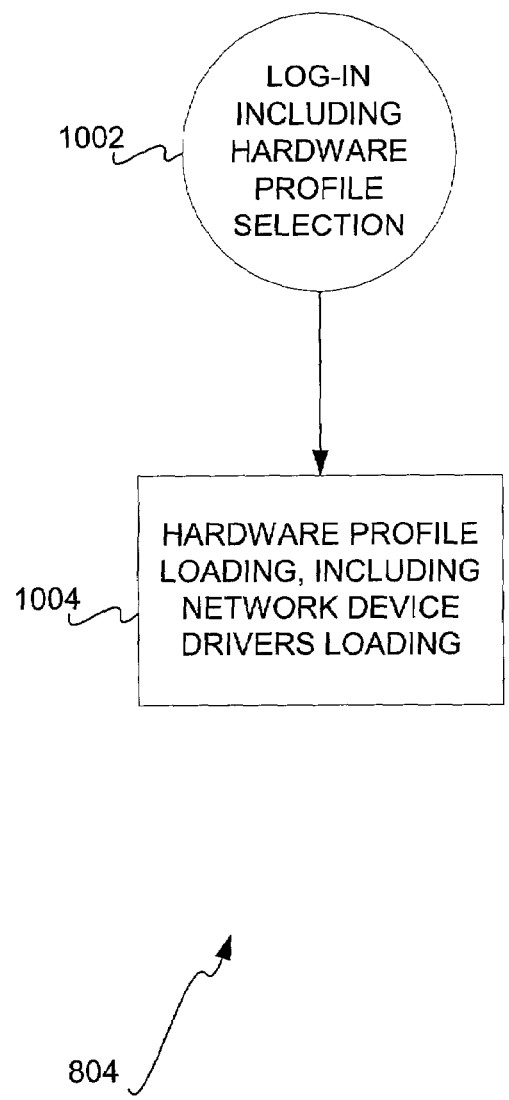

FIGS. 8–10 show the boot sequences that can be followed by a computer, such as by a basic input/output system (BIOS) and/or the operating system of the computer, to achieve user selection of network connectivity at log-in, according to varying embodiments of the invention. The boot sequence is generally defined as the overall startup process followed by the computer, so that the computer after this sequence has been executed is ready to run programs or otherwise can be used. The computer can follow all or part of the boot sequences of FIGS. 8–10, such that network connectivity is established only after a user has logged in and specified one or more networks with which the user wishes to communicate. The boot sequences can be stored as instructions on a computer-readable medium, such as one or more of a memory, a hard disk drive, a floppy disk, and a CD-ROM. A processor then executes these instructions.

More specifically, FIG. 8 outlines the general boot sequence process, in which there is a pre-log-in boot sequence (802), and a post-log-in boot sequence (804). User log-in, during which desired network connectivity is specified, occurs between the sequences, and is not specifically shown in FIG. 8. The pre-log-in boot sequence preferably is performed without selecting a hardware profile, and without loading drivers for the network devices, or components. The post-log-in boot sequence preferably includes loading the hardware profile and the network device drivers consistent with the hardware and network profiles at least implicitly selected by the user during log-in.

FIG. 9 illustrates in more detail one embodiment of the pre-log-in boot sequence 802 of FIG. 8. The pre-log-in boot sequence 802 depicted in FIG. 9 is generally particular to at least some versions of the MICROSOFT WINDOWS operating system, though the invention itself can be used in conjunction with other operating systems. First, a power-on self-test (POST) is performed (902). The POST determines the amount of memory available, and whether needed hardware components, such as the keyboard, are present. Once the computer has run its POST routine, each network adapter that has its own BIOS may also run its own POST routine.

Next, an initial start-up process (904) is performed relative to a startup disk, such as a hard disk, a floppy disk, or a CD-ROM. If the hard disk is the startup disk, the BIOS reads a master boot record therefrom, and loads it into memory. The BIOS then transfers execution to the master boot record, the code of which scans a partition table for the system partition to be executed. The appropriate partition boot sector code is executed from this system partition, which is known as the boot loader process (906). The boot loader process is performed without loading or selecting a specific hardware profile.

The boot loader process may load an operating system in a manner defined by the operating system. Alternatively, the operating system may be selected by the user (908), after which the partition boot sector code transfers execution to the partition boot sector code for the selected operating system. However, in the case of a floppy disk or a CD-ROM, there is usually only a single system partition, and the appropriate partition boot sector code is immediately executed without executing a master boot record, and without giving the user an opportunity to select the operating system.

Some of the hardware of the computer system is then detected (910). This hardware generally includes the identification of the computer, the bus/adapter type, the video sub-system, the keyboard, communication ports, parallel ports, floppy disk drives, and a mouse or other pointing device. Finally, the kernel of the operating system is loaded and initialized, but without loading the network device drivers (912). This is in contrast to the prior art, which may also permit selection of a hardware profile between 910 and 912. The kernel of the operating system is the fundamental part of the operating system, and resides in memory at all times and provides basic services. It is the part of the operating system that is closest to the machine and may activate the hardware directly or interface to another software layer that drives the hardware.

FIG. 10 illustrates in more detail one embodiment of the post-log-in boot sequence 804 of FIG. 8. The post-log-in boot sequence 804 depicted in FIG. 10 is generally specific to at least some versions of the MICROSOFT WINDOWS operating system, though the invention itself can be used in conjunction with other operating systems. The post-log-in boot sequence 804 depicted in FIG. 10 includes loading the hardware profile and the network device drivers (1004), after user log-in (1002) has occurred. The user log-in is consistent with that described in conjunction with FIGS. 5–7 in the previous section of the detailed description, where the user at least implicitly selects the hardware and the network profiles to communicate with a desired one or more networks. The loading of the hardware profile and the network device drivers is consistent with and according to the hardware and the network profiles at least implicitly selected during user log-in.

Different parts of the boot sequence depicted in FIGS. 9 and 10 may be performed by the BIOS and the operating system. For example, the BIOS typically performs the POST (902), the initial start-up process (904), and the boot loader process (906). The operating system typically performs the configuration selection (912), the kernel loading and initialization (914), the user log-in (1002) and the hardware profile and network device drivers loading (1004). The OS selection (908) is typically performed by the code loaded during the boot loader process. The hardware detection (910) is typically performed by either this code or by the operating system.

It is noted that, although specific embodiments have been illustrated and described herein, it will be appreciated by those of ordinary skill in the art that any arrangement is calculated to achieve the same purpose may be substituted for the specific embodiments shown. For example, other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A computer comprising:
at least one network component, each network component enabling the computer to communicate with one or more different networks; and
an initial boot sequence in which a network device driver for each network component is loaded and network connectivity is established only after a user has logged in, such that the user specifies a desired one of the one or more different networks during log-in,
wherein the initial boot sequence is executed at least in part by a basic input/output system (BIOS) of the computer without loading the network device driver, and
wherein the initial boot sequence comprises at least the log-in including hardware profile selection, and hardware profile loading including the network device drivers loading after the log-in.

2. The computer of claim 1, wherein the user specifies the desired one of the one or more different networks during log-in by specifying a unique user name and a unique domain.

3. The computer of claim 1, wherein the user specifies the desired one of the one or more different networks during log-in by specifying a unique combination of a user name and a domain.

4. The computer of claim 1, wherein the user specifies the desired one of the one or more different networks during log-in by specifying at least one or more of a unique user name, a unique network profile, and a unique hardware profile.

5. The computer of claim 1, wherein the initial boot sequence further comprises at least one or more of: hardware detection, and kernel loading without the network device driver loading.

6. The computer of claim 1, wherein the initial boot sequence further comprises at least a boot loader process without hardware profile selection, and kernel loading without the network device driver loading.

7. The computer of claim 1, such that the at least one network component comprises a modem enabling the computer to communicate with at least a subset of the one or more different networks over a phone line.

8. The computer of claim 1, such that the at least one network component comprises a network adapter enabling the computer to communicate with at least a subset of the one or more different networks.

9. The computer of claim 1, such that the at least one network component comprises a network adapter enabling the computer to communicate with at least a subset of the one or more different networks through a broadband modem.

10. The computer of claim 1, wherein the one or more different networks comprises one or more of: an Ethernet network, the Internet, an intranet, an extranet, a corporate network, a personal network, a wide-area networks (WAN), a local-area network (LAN), and a virtual private network (VPN).

* * * * *